US008422773B2

(12) United States Patent
Suzuki et al.

(10) Patent No.: US 8,422,773 B2
(45) Date of Patent: Apr. 16, 2013

(54) IMAGE ZONE DETECTING USING COLOR GRADATION LEVELS, METHOD, APPARATUS AND COMPUTER READABLE MEDIUM

(75) Inventors: Genta Suzuki, Kawasaki (JP); Kenichiro Sakai, Kawasaki (JP); Hirotaka Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1250 days.

(21) Appl. No.: 12/149,378

(22) Filed: Apr. 30, 2008

(65) Prior Publication Data

US 2008/0285846 A1    Nov. 20, 2008

(30) Foreign Application Priority Data

May 14, 2007    (JP) ................................. 2007-128663

(51) Int. Cl.
*G06K 9/34*    (2006.01)
(52) U.S. Cl.
USPC ............ 382/164; 382/100; 382/166; 382/167
(58) Field of Classification Search .................. 382/162, 382/167, 100
See application file for complete search history.

(56) References Cited

U.S. PATENT DOCUMENTS

| 6,141,441 | A  | * | 10/2000 | Cass et al. ............... 382/166 |
| 6,333,993 | B1 | * | 12/2001 | Sakamoto ............... 382/173 |
| 7,149,000 | B1 | * | 12/2006 | Sakai et al. ............. 358/3.28 |
| 7,477,798 | B2 | * | 1/2009  | Moroo et al. ........... 382/291 |
| 7,813,553 | B2 | * | 10/2010 | Suzuki et al. ........... 382/190 |
| 7,961,905 | B2 | * | 6/2011  | Harrington ............. 382/100 |
| 2003/0063319 | A1 | * | 4/2003 | Umeda et al. .......... 358/3.28 |
| 2005/0169531 | A1 | * | 8/2005 | Fan ......................... 382/199 |
| 2005/0226534 | A1 | * | 10/2005 | Moroo et al. ........... 382/291 |
| 2006/0280353 | A1 | * | 12/2006 | Yi ............................ 382/135 |
| 2007/0083764 | A1 | * | 4/2007 | Chiba et al. ............. 713/176 |
| 2008/0285846 | A1 | * | 11/2008 | Suzuki et al. ........... 382/164 |

FOREIGN PATENT DOCUMENTS

| EP | 1 480 163   | 11/2004 |
| EP | 1 729 497   | 12/2006 |
| JP | 2001-24873  | 1/2001  |
| JP | 2003-110845 | 4/2003  |
| JP | 2003-110846 | 4/2003  |
| JP | 2005-277732 | 10/2005 |
| JP | 2005-293409 | 10/2005 |

OTHER PUBLICATIONS

Extended European Search Report issued Jul. 10, 2008 in corresponding European Patent Application No. 08103708.7.

(Continued)

*Primary Examiner* — Claire X Wang
*Assistant Examiner* — Gandhi Thirugnanam
(74) *Attorney, Agent, or Firm* — Staas & Halsey LLP

(57) ABSTRACT

An image processing method according to the present invention is contrived to change the gradation level (of the color component corresponding to the complementary color of yellow) for a pixel within a zone located on a corner of a rectangular image so as to maximize the difference between the gradation level of a pixel that is a processing target and the gradation level of a pixel in a background area in the surrounding area of the pixel that is the processing target, that is, lowering the gradation level. This means the pixel that is a result of applying the process for changing the gradation levels looks yellowish. The human eye has difficulty in recognizing yellow and therefore the change applied to the pixel is inconspicuous as compared to the case of placing a mark or frame on the outside of a rectangular zone.

5 Claims, 18 Drawing Sheets

OTHER PUBLICATIONS

European Office Action dated Mar. 11, 2010 and issued in corresponding European Patent Application 08 103 708.7.

Japanese Office Action issued Jun. 28, 2011 in corresponding Japanese Patent Application 2007-128663.

* cited by examiner

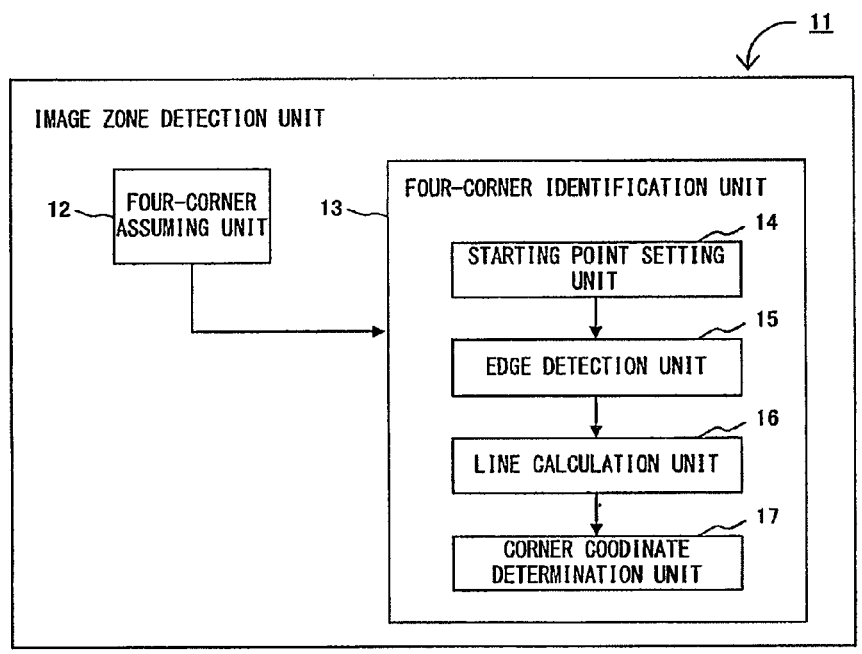
F I G. 8

| -1 | -1 | 4 | -1 | -1 |

FIG. 16

IMAGE ZONE DETECTING USING COLOR GRADATION LEVELS, METHOD, APPARATUS AND COMPUTER READABLE MEDIUM

BACKGROUND OF THE INVENTION

1. Field of the Invention

The present invention relates to a technique for identifying the four corners of a rectangular image in which a code is embedded when the image is pictured and imported.

2. Description of the Related Art

Conventionally, a rectangular image in which a code is embedded (simply noted as "rectangular image" hereinafter) is printed, or electronically displayed, on a medium, then the image is imported by photographing the rectangular image on the medium with a portable phone equipped with a camera (noted as "camera phone" hereinafter), the code, which is embedded in the rectangular zone using an electronic watermarking technique, is read and the information corresponding to the code is displayed on the screen of the portable phone.

In such a process, a frame is provided on the outside of the rectangular zone, or a mark is provided therein, in order to identify the section in which the imported rectangular zone exists.

As an example, a rectangular image is provided with three or more cross- or L-shaped positional detection marks, as shown in FIGS. 1 and 2, according to reference patent document 1. Meanwhile, a rectangular image is provided with a frame (in a prescribed color) in order to identify the zone of the rectangular image, as shown in FIG. 3, according to reference patent document 2.

The conventional techniques are faced with the problem of degrading appearance because the rectangular image is provided with a mark or frame.

Patent document 1: Laid-Open Japanese Patent Application Publication No. 2005-293409, "SPECIFIC IMAGE POSITION ESTIMATING DEVICE, SPECIFIC IMAGE POSITION ESTIMATING METHOD, SPECIFIC IMAGE POSITION ESTIMATING PROGRAM, RECORDING MEDIUM COMPUTER-READABLE WITH SPECIFIC IMAGE POSITION ESTIMATING PROGRAM STORED, AND MEDIUM"

Patent document 2: Laid-Open Japanese Patent Application Publication No. 2003-110845, "IMAGE PROCESSOR, ITS CONTROL METHOD, COMPUTER PROGRAM AND RECORDING MEDIUM"

SUMMARY OF THE INVENTION

In consideration of the situation as described above, the present invention aims at providing an image processing method, an image zone detection method, an image processing program, an image zone detection program, an image processing apparatus, and an image zone detection apparatus that enables the easy identification of the four corners of a rectangle by minimizing visual changes in a rectangular image in which a code is embedded when the rectangular image is pictured and imported.

According to a first aspect of the present invention, an image processing method for changing the gradation levels of a pixel within the rectangular zone of a rectangular image in which a code is embedded comprises the steps of:

obtaining a gradation level of a color that is equivalent to the complementary color of yellow for a pixel in a background area;

obtaining a gradation level of the color that is equivalent to the complementary color of yellow for a pixel that is a target of processing, within a zone located on a corner of the rectangular image;

obtaining the minimum value of gradation levels of the color that is equivalent to the complementary color of yellow from among pixels included in a predefined section for the pixel that is the processing target; and changing gradation levels so that the difference between the gradation level of the pixel that is the processing target and that of a pixel in the background area is maximized in the area surrounding the pixel that is the processing target by using the obtained respective gradation levels, wherein each of the steps is carried out for all pixels within the zone located on the corner of the rectangular image.

Here, the method is configured to change the gradation level (of the color component corresponding to the complementary color of yellow) for a pixel within a zone located on a corner of the rectangular image so as to maximize the difference between the gradation level of a pixel that is a processing target and the gradation level of a pixel in a background area in the surrounding area of the pixel that is the processing target, that is, lowering the gradation level. This means that the pixel that is a result of applying the process for changing the gradation levels looks yellowish. The human eye has difficulty in recognizing yellow and therefore the change applied to the pixel is inconspicuous as compared to the case of placing a mark or frame on the outside of a rectangular zone.

Further, it is also configured to refer to the lowest gradation level in the vicinity of the pixel that is the processing target when changing the gradation level of the pixel that is the processing target, thereby making it possible to prevent erroneous detection of an edge if there is no difference in gradation level between the background area and the outer rim of an image and that there is instead a difference in gradation levels a small distance inward from the outer rim of the image that is more than the difference between the background area and the outer rim of the image, and to enable an easy identification of an image zone when an image to which a process for changing gradation levels is applied is printed on a medium or electronically displayed and then photographed by a camera and imported as image data and the process for detecting the four corners of the imported image data is carried out.

According to a second aspect of the present invention, an image processing method for changing the gradation levels of a pixel within the rectangular zone of a rectangular image in which a code is embedded comprises the steps of:

obtaining a gradation level of a color that is equivalent to the complementary color of yellow for a pixel in a background area;

obtaining a gradation level of the color that is equivalent to the complementary color of yellow for a pixel that is a target of processing, within a zone located on a corner of the rectangular image;

obtaining the minimum value of gradation levels of the color that is equivalent to the complementary color of yellow from among pixels included in a predefined section for the pixel that is the processing target;

judging whether the first difference between the gradation level of the background area and that of the pixel that is the processing target is equal or greater than a first threshold value; and if the first difference is smaller than the first threshold value, changing the value of the pixel that is the processing target to the smaller of two values:

(i) the second difference between the gradation level of the background area and the first threshold value, and
(ii) the aforementioned minimum value;
wherein each of the steps is carried out for all pixels within the zone located on the corner.

Here, the method is configured to obtain the value of the (minimum) gradation level that is most different from the gradation level of the background area that is in the vicinity of a pixel that is within the zone located on a corner of a rectangular image, to compare the difference between the gradation level of the background area with a value that is a predefined first threshold value, and to change the gradation level (of the color component corresponding to the complementary color of yellow) of the pixel that is the processing target to a (smaller) value, which increases the difference from the gradation level of the background area. This means that the pixel that is a result of applying the process for changing the gradation levels looks yellowish. The human eye has difficulty in recognizing yellow and therefore the change applied to the pixel is inconspicuous as compared to the case of placing a mark or frame on the outside of a rectangular zone.

Further, the method is also configured to refer to the lowest gradation level in the vicinity of the pixel that is the processing target, when changing the gradation level of the pixel that is the processing target, thereby making it possible to prevent erroneous detection of an edge that may result if there is no difference in gradation levels between the background area and the outer rim of an image but instead a difference in gradation levels a small distance inward from the outer rim of the image that is greater than the difference between the background area and the outer rim of the image, and to enable easy identification of an image zone when an image to which a process for changing gradation levels is applied is printed on a medium or electronically displayed and then photographed by a camera and imported as image data, and the process for detecting the four corners of the imported image data is carried out.

According to a third aspect of the present invention, an image zone detection method for detecting a rectangular zone of image data obtained by photographing a rectangular image that is printed on a medium or electronically displayed on a medium and in which a code is embedded and the gradation level of pixels has been changed by using the method according to the first or second aspect comprises the steps of:

setting four starting points for detecting one of the assumed corners of the rectangular image;

detecting four points on edges of the rectangular image in predefined directions from the four starting points;

acquiring (i) a first straight line interconnecting two points of the four points on the edges, of which the coordinates in the vertical direction are approximately the same, and (ii) a second straight line interconnecting two points of the four points on the edges, of which the coordinates in the horizontal direction are approximately the same; and determining the coordinate of the intersection between the first straight line and the second straight line as the coordinates of one corner of the four corners of the rectangular image, wherein each of the steps is carried out for all of the assumed corners of the rectangular image.

The third aspect makes it possible to detect the positions of four corners of image data obtained from an image and to detect an image zone, in the case where the image of which the gradation levels are changed by the method according to the first or second aspect is imported.

The present invention makes it possible to minimize visual changes in a rectangular image in which a code is embedded as much as possible and to enable easy identification of the four corners of the rectangle when the rectangular image is photographed and imported.

BRIEF DESCRIPTION OF THE DRAWINGS

FIG. 8 is a block diagram showing the configuration of an image zone detection unit according to a second preferred embodiment of the present invention;

FIG. 16 is a diagram showing one example of a filter for detecting an edge;

DESCRIPTION OF THE PREFERRED EMBODIMENTS

The following is a description in detail of the preferred embodiments of the present invention by referring to the accompanying drawings.

Figure 1:
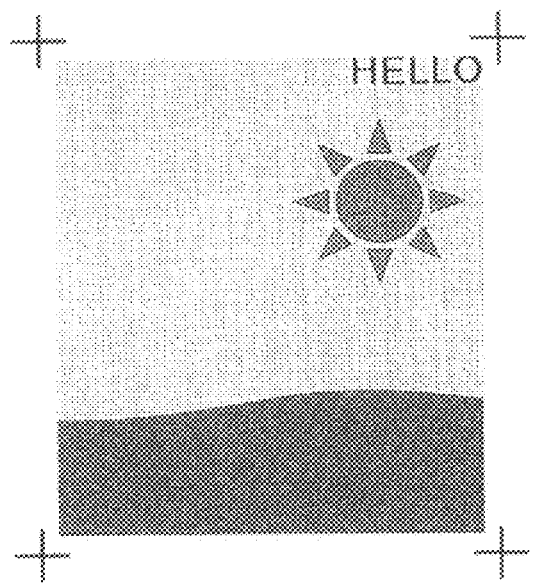
FIG. 1 exemplifies a rectangular image provided with crosses.
Figure 2:
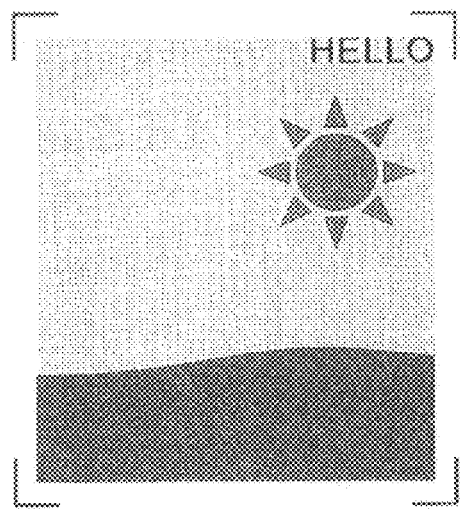
FIG. 2 exemplifies a rectangular image provided with L-shaped figures.
Figure 3:
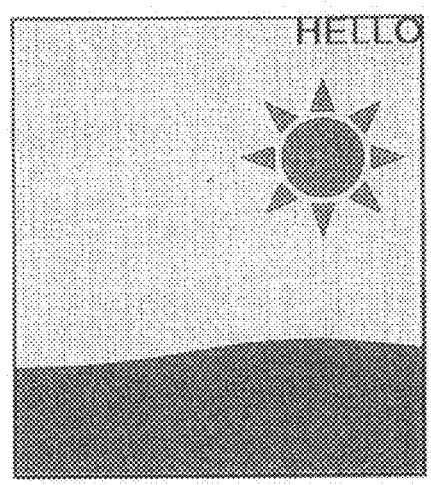
FIG. 3 exemplifies a rectangular image provided with a frame.
Figure 4:
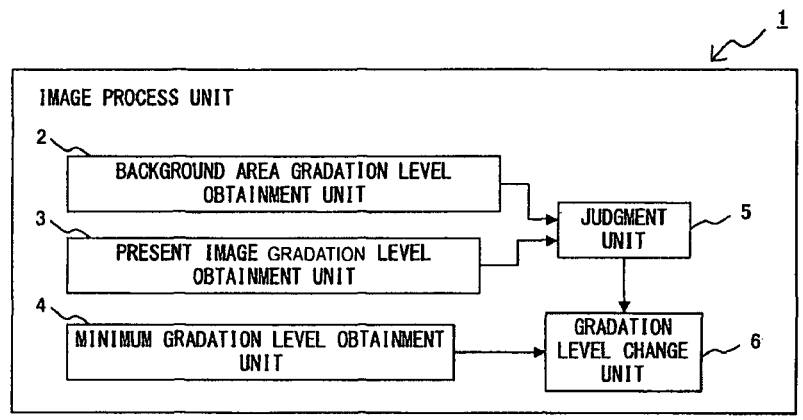
FIG. 4 is a block diagram showing the configuration of an image process unit according to a first preferred embodiment of the present invention.

FIG. 4 is a block diagram showing the configuration of an image process unit according to a first preferred embodiment of the present invention. An image process unit 1 changes the gradation levels of pixels within four zones located at four corners on a rectangular image (in which a code is embedded) those are process target zones. These zones are L-shaped zones (noted as "L-shaped zone" hereinafter) at the four corners of the rectangular image.

As shown in FIG. 4, the image process unit 1 comprises a background area gradation level obtainment unit 2, a present image gradation level obtainment unit 3, a minimum gradation level obtainment unit 4, a judgment unit 5, and a gradation level change unit 6.

The background area gradation level obtainment unit 2 obtains the gradation level of a color corresponding to the complementary color of yellow for a pixel in the background area.

The present image gradation level obtainment unit 3 obtains the gradation level of a color corresponding to the complementary color of yellow for a pixel that is a processing target within the L-shaped zone within the rectangular image.

The minimum gradation level obtainment unit 4 obtains the minimum value of gradation levels of the color corresponding to the complementary color of yellow from among the pixels included in a predefined section (the L-shaped zone) for the pixel that is the processing target.

The judgment unit 5 judges whether the first difference is equal or greater than a first threshold value. Here, the first difference is the difference between the gradation level of the background area and that of the pixel that is the processing target.

When the first difference is smaller than the first threshold value, the gradation level change unit 6 changes the gradation level of the pixel that is the processing target to the smaller of two values:

(i) the second difference between the gradation level of the background area and the first threshold value, and (ii) the minimum value.

Note that unit 1 encloses the above units 2-6 operating for all pixels within the L-shaped zone on the corners of the rectangular image.

Figure 5:
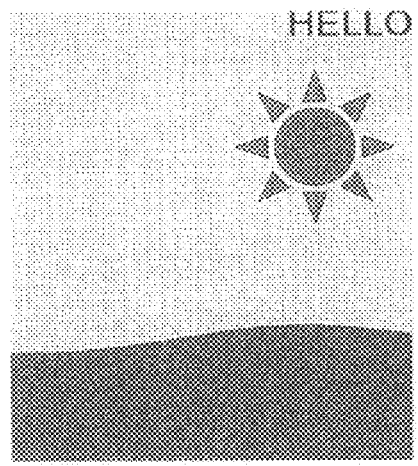
FIG. 5 is a diagram showing original image data in which a code is embedded.

FIG. 5 is a diagram showing original image data in which a code is embedded.

Figure 6:
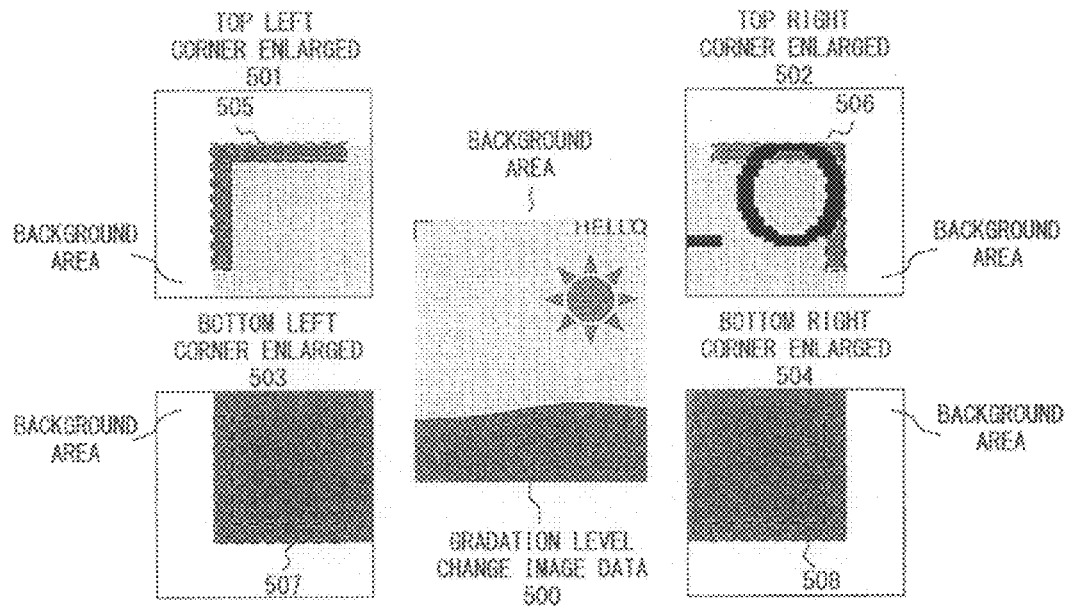
FIG. 6 is a diagram describing a gradation change process (i.e., image processing) applied to the original imaged at a shown in FIG. 5.

FIG. 6 is a diagram describing a gradation change process (i.e., image processing) applied to the original image data shown in FIG. 5.

Referring to FIG. 6, gradation-level change image data 500 is image data that is a result of applying, to the original image data shown in FIG. 5, the gradation change process according to the present embodiment. Zones 501, 502, 503 and 504 indicate zones that respectively include the four corners of the gradation-level change image data 500. That is, zone 501 shows a zone (i.e., an enlarged drawing) including the top left corner of the gradation-level change image data 500, zone 502 shows a zone (i.e., an enlarged drawing) including the top right corner thereof, zone 503 shows a zone (i.e., an enlarged drawing) including the bottom left corner thereof, and zone 504 shows a zone (i.e., an enlarged drawing) including the bottom right corner thereof.

The zone 501 has an L-shaped zone 505 that is a target zone for changing the gradation levels. Here, the L-shaped zone 505 has respective predefined lengths along the two sides forming the corner starting from the top left edge and respective predefined widths from the two sides toward the inside of the image.

Further, the zone 502 has an L-shaped zone 506 that is a target zone for changing the gradation levels. The L-shaped zone 506 has respective predefined lengths along the two sides forming the corner starting from the top right edge and respective predefined widths from the two sides toward the inside of the image.

Further, zone 503 has an L-shaped zone 507 that is a target zone for changing the gradation levels. The L-shaped zone 507 has respective predefined lengths along the two sides forming the corner starting from the bottom left edge and respective predefined widths from the two sides toward the inside of the image.

Further, zone 504 has an L-shaped zone 508 that is a target zone for changing the gradation levels. The L-shaped zone 508 has respective predefined lengths along the two sides forming the corner starting from the bottom right edge and respective predefined widths from the two sides toward the inside of the image.

Incidentally, the following description sometimes refers to the L-shaped zones 505, 506, 507 and 508 as four corner symbol zones.

Figure 7:
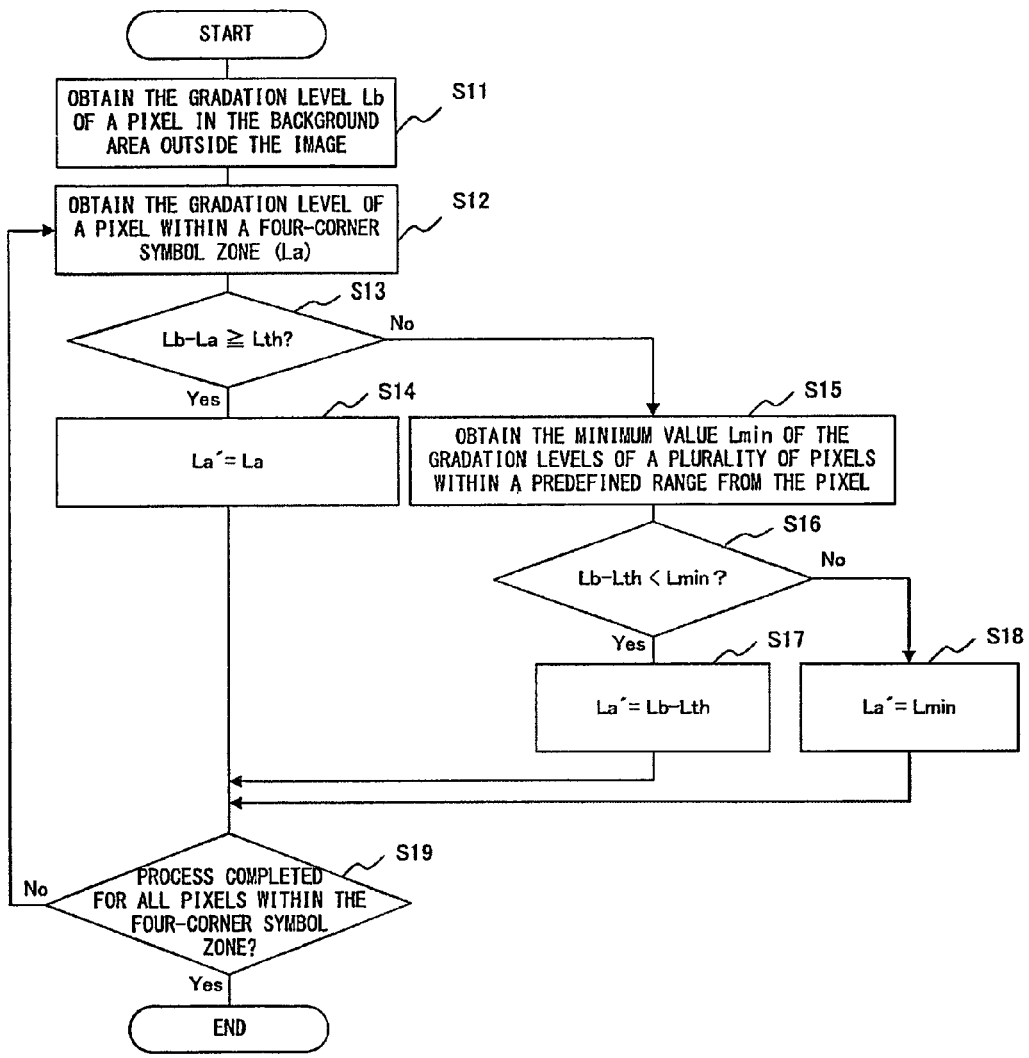
FIG. 7 is a flowchart of a gradation change process (i.e., image processing) applied to the original image data.

FIG. 7 is a flow chart of a gradation change process (i.e., image processing) applied to the original image data.

Note that the present embodiment is configured to express colors in an RGB format. Further, based on the fact that yellow is inconspicuous, only the gradation level of a color component corresponding to the complementary color of yellow, that is, the blue (B) component in the RGB format is changed. The gradation level of the blue (B) component of pixels in the L-shaped zones is changed so that the difference between the gradation level of the background area and that of the L-shaped zone is maximized. That is to say, the gradation level of the blue (B) component of pixels in the L-shaped zones is weakened. The gradation levels of the red (R) component and green (G) component are not changed.

Referring to FIG. 7, in step S11 (also noted as "S11" hereinafter), the background area gradation level obtainment unit 2 of FIG. 4 obtains the gradation level Lb of the B component of a pixel that is outside of an image, that is, in the background area of the image. For example, Lb=255 if the background is white.

In S12, the present image gradation level obtainment unit 3 obtains the gradation level La of the B component of the pixel that is a processing target within a four-corner symbol zone (i.e., either the top left, top right, bottom left or bottom right corner L-shaped zone).

In S13, the judgment unit 5 judges whether the first difference between the obtained gradation level Lb of the background area and the obtained gradation level La of the pixel that is the processing target is no less than a first threshold value Lth.

If the first difference between the gradation levels Lb and La is judged to be no less than the first threshold value Lth in S13, the gradation level La of the pixel that is the processing target is stored as a variable La' in S14. Here, La' is a variable which represents a post-change gradation level of the pixel. Then the process shifts to S19. That is, the gradation level of the pixel that is the processing target is not changed in this case.

If the first difference between the gradation levels Lb and La is judged to be less than the first threshold value Lth in S13, the minimum gradation level obtainment unit 4 obtains the minimum value Lmin of the gradation level of the B component from among the pixels included in a predefined section in S15. Here, the predefined section is one of the L-shaped zones.

In the subsequent step, S16, the gradation level change unit 6 judges whether the second difference (i.e., Lb−Lth) between the gradation level Lb of the background area and the first threshold value Lth is smaller than the minimum value Lmin of the gradation levels of the B component among the pixels included in a predefined section.

If the second difference (i.e., Lb−Lth) is judged to be smaller than the minimum value Lmin of the gradation levels of the predefined section in S16, the gradation level change unit 6 stores the value of Lb−Lth, as the variable La' in S17. The La' is a post-change gradation level of the pixel that is the processing target. In this case, the difference between the post-change gradation level of the target pixel that is the processing target (Lb−Lth) and that of the background area (Lb) become identical with the first threshold value (Lth). Then the process shifts to S19.

If the second difference (i.e., Lb−Lth) is judged to be no smaller than the minimum value Lmin of the gradation levels of the predefined section in S16, the gradation level change unit 6 stores the minimum value Lmin of the gradation levels of the predefined section as the variable La' in S18. And the value of the valuable La' (Lmin) become a post-change gradation level of the pixel. Then the process shifts to S19.

In S19, whether the processes are completed for all pixels of the four-corner symbol zone is judged. If the processes are judged to be not completed, the process returns to S12. In contrast, if the processes are judged to be completed, the series of the processes ends.

As described above, the present embodiment is configured to obtain the value of the (minimum) gradation level that is most different from the gradation level of the background area in the vicinity of a pixel within the four-corner symbol zone, to compare the value (Lmin) with the second difference between the gradation level of the background area and the first threshold value (i.e., Lb−Lth), and to change the gradation level (of the color component corresponding to the complementary color of yellow) of the pixel that is the processing target to a (smaller) value which increases the difference from the gradation level of the background area.

The method of making the gradation level of the B component that is a processing target be apart from the gradation level of the B component of the background area leads to lowering the gradation level of the B component that is the processing target. This means that the pixel that is a result of applying a process of changing the gradation level looks yellowish. The human eye has difficulty in recognizing yellow and therefore the change applied to a pixel is less conspicuous as compared to placing a mark or frame on the outside of a rectangular zone.

Further, it is also configured to refer to the lowest gradation level in the vicinity of a pixel when changing the gradation level thereof, thereby making it possible to prevent erroneous detection of an edge resulting from the fact that there is no difference in gradation levels from the background area at an outer rim of an image and that there is instead a difference in gradation levels that is greater than the difference between the background area and the outer rim of the image a small distance inward from the outer rim of the image, and to enable easy identification of an image zone when an image to which a process for changing gradation levels is applied is printed on a medium or electronically displayed and then photographed by a camera and imported as image data, and then the process for detecting the four corners of the imported image data is carried out.

Incidentally, when the image to which the process for changing gradation levels is applied using the above described method is printed on a medium or electronically displayed and the image is photographed by a camera and imported as image data, two to three pixels of the original image data correspond to one pixel of the imported image data. Because of this, a predefined section of searching for the minimum value Lmin of gradation levels is desirably provided with at least two to three rows, or two to three columns, for the pixel that is a process target in a direction perpendicular to the process direction of the gradation level change process.

Next is a description of a second preferred embodiment.

FIG. 8 is a block diagram showing the configuration of an image zone detection unit according to a second preferred embodiment of the present invention.

The image zone detection unit 11 applies a process for detecting a rectangular zone of an image that is obtained by pictured (i.e., photographing) the rectangular image that is printed on a medium and in which a code is embedded and the gradation levels of a pixel are changed by the method according to the first embodiment.

As shown in FIG. 8, the image zone detection unit 11 comprises a four-corner assuming unit 12 and a four-corner identification unit 13.

The four-corner assuming unit 12 assumes the location and size of a section in which one of the four corners of the pictured rectangular image exists.

The four-corner identification unit 13, comprising a starting point setting unit 14, an edge detection unit 15, a line calculation unit 16, and a corner coordinate determination unit 17. The four-corner identification unit 13 determines a corner coordinate once the unit 13 is initiated. One corner coordinate is determined in one assumed section estimated by the four-corner assuming unit 12.

The starting point setting unit 14 sets four starting points to be used for detecting the edges for one of the assumed section estimated by the four-corner assuming unit 12.

The edge detection unit 15 detects four points on the edges of the rectangular image in predefined directions from the four starting points.

The line calculation unit 16 calculates both (i) a first line connecting two points, of which the coordinates in the vertical direction are approximately the same for the four points on the edges, and (ii) a second line connecting two points, of which the coordinates in the horizontal direction are approximately the same for the points on the edges.

The corner coordinate determination unit 17 determines the intersection coordinate of the first and second lines. The intersection coordinate is corresponding to an assumed corner of the rectangular image in an assumed section.

Note that the image zone detection unit 11 encloses the above units 12-17 operating for all of the assumed sections in which the four corners exist.

Figure 9:
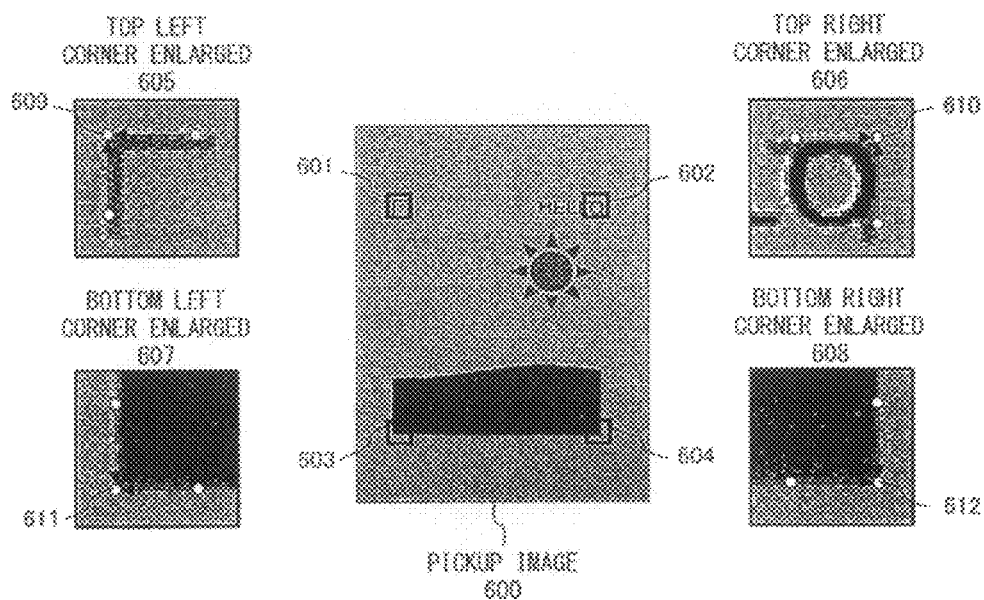
FIG. 9 is a diagram describing an image zone detection process applied to imported image data.

FIG. 9 is a diagram describing an image zone detection process applied to imported image data.

Referring to FIG. 9, pickup image data 600 is image data imported by photographing an image from the medium on which the image is printed, the image being the result of applying the gradation change process according to the first embodiment. Sections 601, 602, 603 and 604 indicate the respective assumed sections in which the four corners exist in the pickup image data 600 estimated by a method described later. Further, sections 605, 606, 607 and 608 are enlarged diagrams of sections 601, 602, 603 and 604, respectively.

As shown in FIG. 9, section 605 includes the top left corner 609 as a detection target. Section 606 includes the top right corner 610 as a detection target. Section 607 includes the bottom left corner 611 as a detection target. Section 608 includes the bottom right corner 612 as a detection target.

Figure 10:
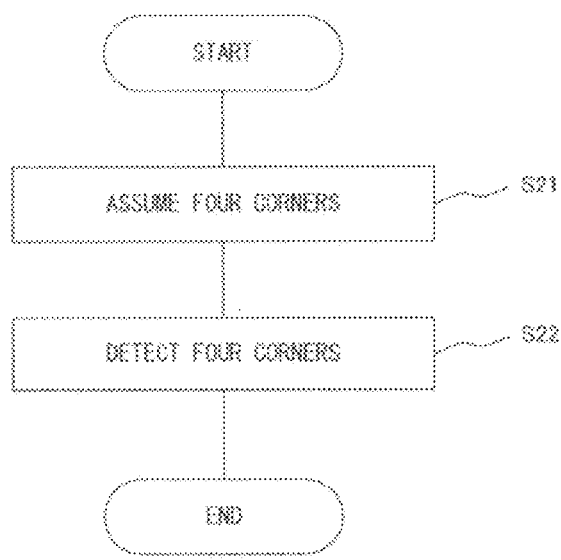
FIG. 10 is an overall flow chart of an image zone (i.e., a rectangular zone) detection process.

FIG. 10 is an overall flow chart of an image zone (i.e., a rectangular zone) detection process.

In S21 of FIG. 10, the four-corner assuming unit 12 assumes the location and size of the sections in which the four corners exist. In S22, the four-corner identification unit 13 carries out a higher precision four-corner detection to establish the coordinates of four corners (i.e., determine the image zone) for pixels within predefined sections on the basis of the assumed coordinates of four corners, respectively, and the series of processes ends.

Figure 11:
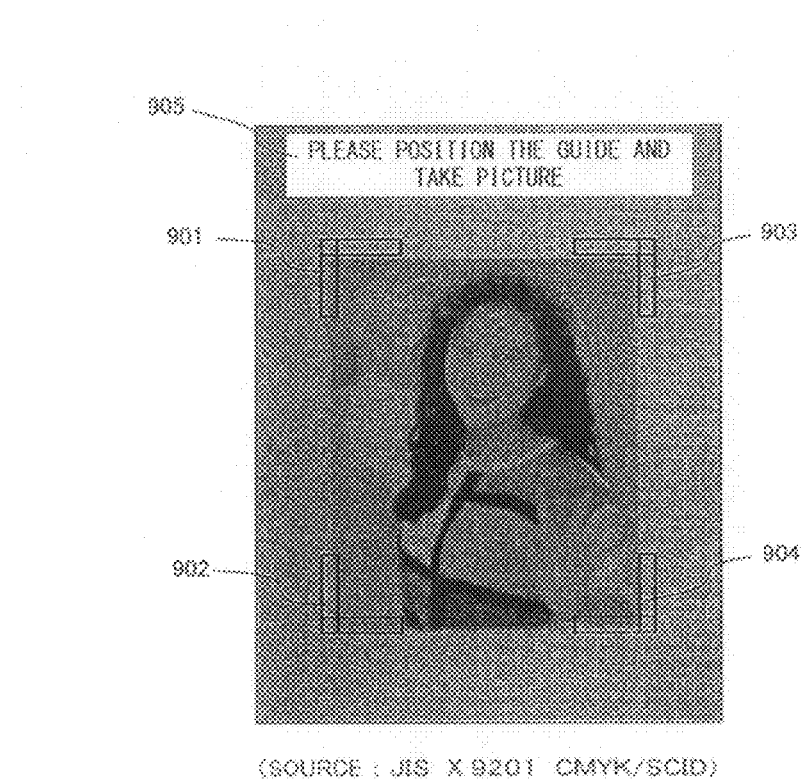
FIG. 11 is a diagram showing a method for estimating the locations of four corners (part 1)
Figure 12:
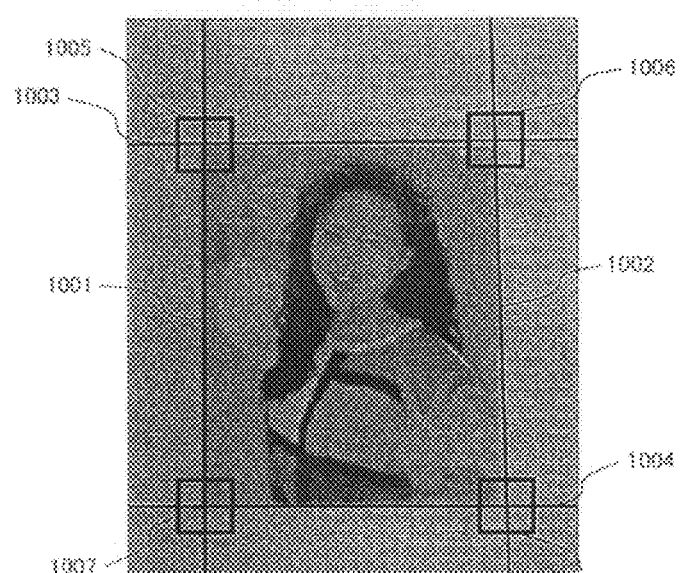
FIG. 12 is a diagram showing a method for estimating the locations of four corners (part 2)

Next is a description of the method for estimating locations of four corners, by referring to FIGS. 11 and 12.

FIG. 11 is a diagram showing a method for estimating the locations of four corners (part 1).

FIG. 11 is a diagram showing an image displayed in the image screen of a camera phone together with guides 901, 902, 903 and 904 used for determining the position when photographing an image on a code-embedded medium by using, for example, the camera phone.

The image screen of the portable phone displays a message 905 (i.e., "please position the guide and take picture") so that the user can refer to the message and takes a picture while the four corners of an image are positioned along the guide. In this case, the sections in which the four corners exist within the image imported by photographing are in the vicinity of the guide position. Such a method is particularly effective if the ratio of the horizontal side to vertical side (i.e. the aspect ratio) of a rectangular image is constant.

FIG. 12 is a diagram showing a method for estimating the locations of four corners (part 2).

FIG. 12 shows the method for detecting the four sides 1001, 1002, 1003 and 1004 of imported image data, assuming the coordinates of four corners by calculating the respective intersections of the two sides, and applying the four-corner detection process to predefined sections 1005, 1006, 1007 and 1008 starting from the respective coordinates.

Figure 13:
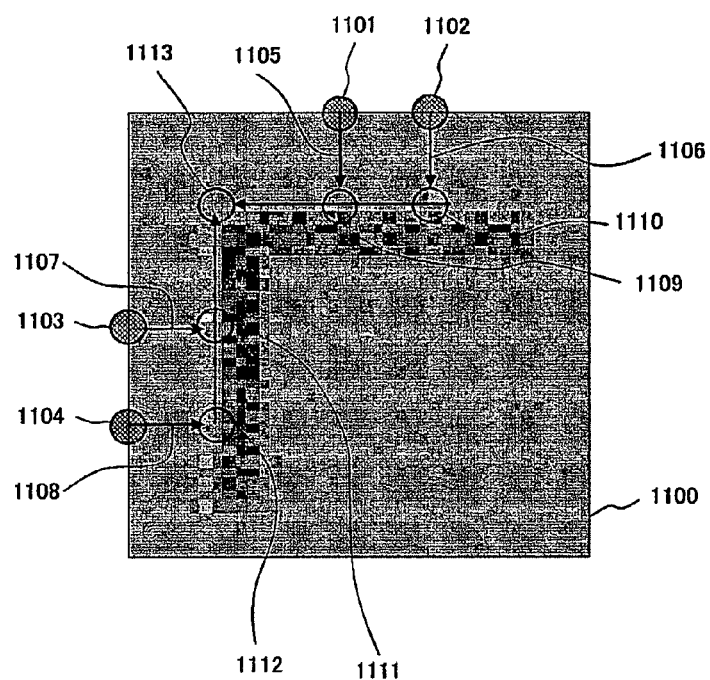
FIG. 13 is a diagram showing a method for detecting the corner coordinates of the top left corner of the four corners.

FIG. 13 is a diagram showing a method for detecting the corner coordinates of the top left corner of the four corners.

Section 1100 including the top left corner shown in FIG. 13 is one of the sections assumed by the four-corner assuming unit 12 as described above. The four-corner assuming unit 12 also assumes the location and size of sections including the top right corner, bottom left corner and bottom right corner, although FIG. 13 does not specifically show them.

Starting points 1101, 1102, 1103 and 1104 are starting points to be used for detecting respective edges. In the case of the top left corner, for example, starting points 1101 and 1102 are respectively placed on the line connecting the top left corner and top right corner of section 1100 and in the positions that result from internally dividing the top left corner and top right corner by a predetermined ratio, while starting points 1103 and 1104 are respectively placed on the line connecting the top left corner and bottom left corner and in the positions that result from internally dividing the top left corner and bottom left corner by a predetermined ratio.

Arrows 1105, 1106, 1107 and 1108 show the process directions of edge detection processes for starting points 1101, 1102, 1103 and 1104, respectively.

Edges 1109, 1110, 1111 and 1112 are four edges detected as a result of the edge detection process.

The coordinate of the top left corner 1113 of the imported image data is acquired as the intersection between (a) the straight line connecting edges 1109 and 1110 and (b) the line connecting edges 1111 and 1112.

Figure 14:
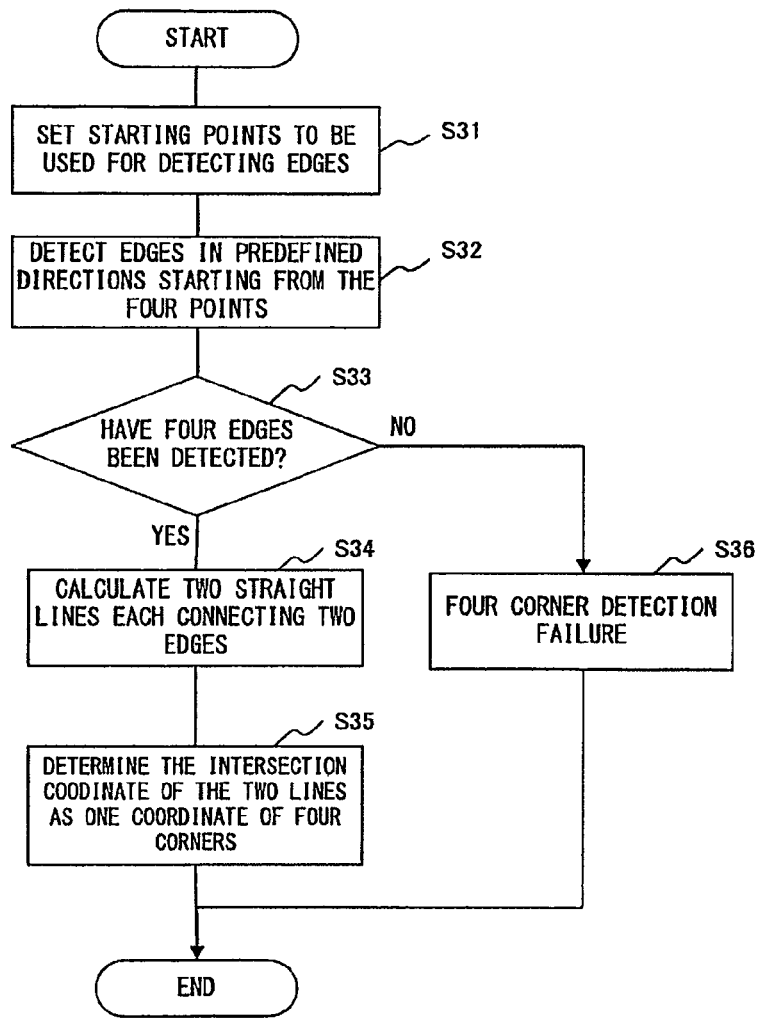
FIG. 14 is a flow chart of the process for detecting one corner of the four corners of an imported image.

FIG. 14 is a flow chart of the process for detecting one corner, from among four corners, of an imported image. The flow chart shows the process of step S22 of FIG. 10 in detail for one specific corner.

In S31 of FIG. 14, the starting point setting unit 14 sets four starting points to be used for detecting edges for one of the assumed sections in which the four corners exist (e.g., section 1100 shown in FIG. 13).

In S32, the edge detection unit 15 detects four points on the edges in predefined directions starting from the four starting points.

In S33, whether four edges are detected in S32 is judged.

If four edges are judged to be detected in S33, both (i) a first line connecting two points, from among the four points on the edges, of which the coordinates in the vertical direction are approximately the same, and (ii) a second line connecting two points, from among the points on the edges, of which the coordinates in the horizontal direction are approximately the same, are calculated from among the four points on the edges in S34.

Further, in S35, the corner coordinate determination unit 17 determines the intersection coordinates of the two straight lines to be the coordinates of one corner of the four corners, and the series of processes ends.

In contrast, if four edges are judged to be not detected in S33, an end code, that is, the four corner detection failed in S36, and the series of processes ends.

Figure 15:
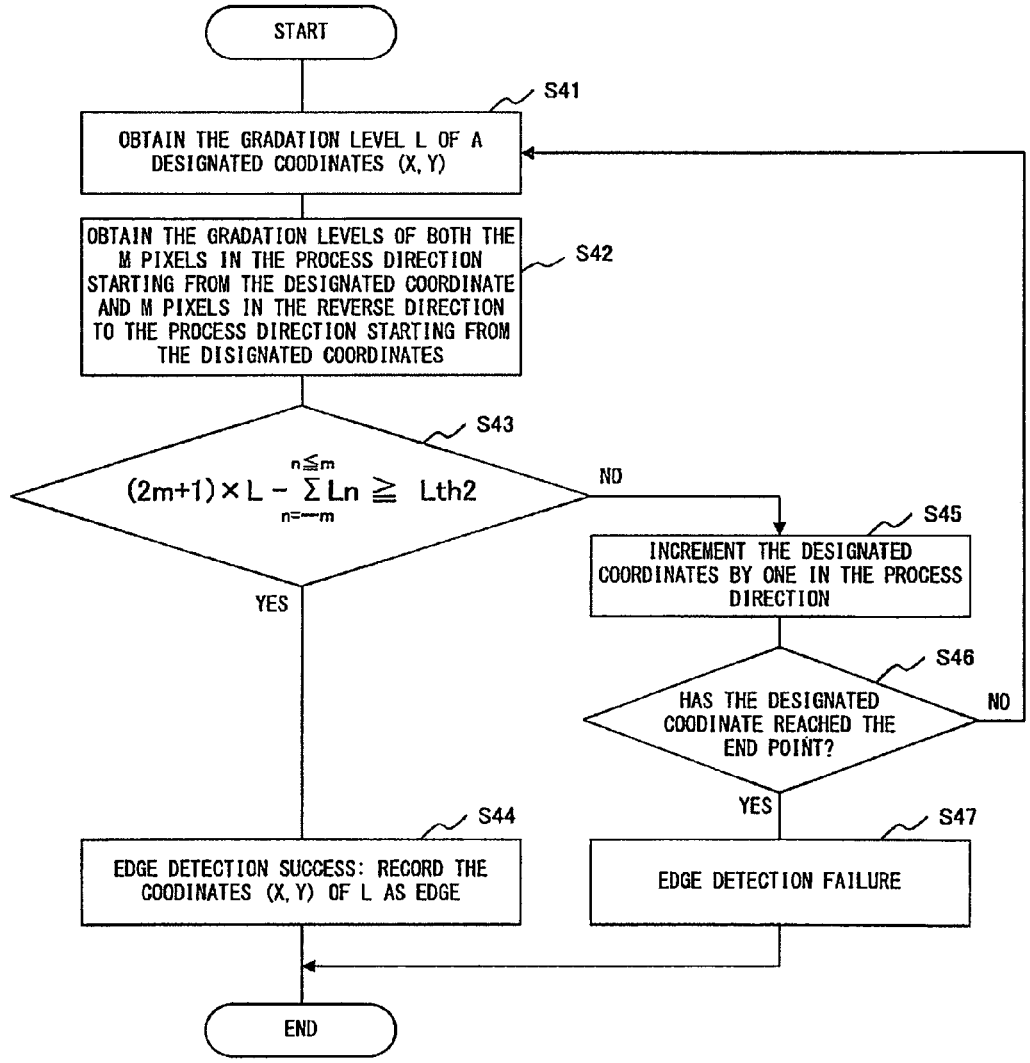
FIG. 15 is a flow chart of the process for detecting an edge of an imported rectangular image using starting points.

FIG. 15 is a flow chart of the process for detecting an edge corresponding to one of four starting points when detecting one corner from among the four corners. This flow chart is carried out by the edge detection unit 15.

In S41 of FIG. 15, the coordinates (x,y) of a position as a processing target are designated and the gradation level L (of component B) corresponding to the complementary color of yellow of the designated coordinates (x,y) is obtained.

In the subsequent step, S42, the gradation levels of component B of m pixels in the process direction from the designated coordinates (x,y), $L_1, L_2, \ldots, L_m$, are obtained, respectively. In addition, the gradation levels of component B of m pixels in the direction reverse to the process direction from the designated coordinates (x,y), $L_{-1}, L_{-2}, \ldots, L_{-m}$, are also obtained, respectively.

In the subsequent step, S43, edges are detected by using an edge detection filter. That is, the gradation level at the present designated coordinates is multiplied by 2m+1, and the gradation levels of the m pixels in the process direction, the gradation level of the designated coordinates (x,y), and, the gradation level of the m pixels in a direction reverse to the process direction are multiplied by −1 (i.e., minus one) and the resultant is added together. Then, whether the result of the aforementioned multiplication and addition is no less than a second threshold value Lth2 is judged.

Figure 16:
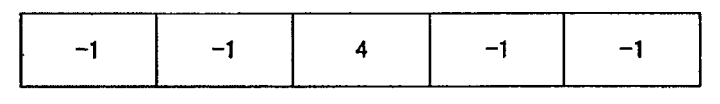

In other words, the gradation level at the present designated coordinates is multiplied by 2m, and the gradation levels of both of the m pixels in the process direction and the m pixels in a direction reverse to the process direction are multiplied by −1 (i.e., minus one) and the resultant is added together. Then, whether the result of the aforementioned multiplication and addition is no less than a second threshold value Lth2 is judged. FIG. 16 is a diagram showing a weighting factor for the gradation levels of the individual positions in the case of m=2.

If the addition result is judged to be no smaller than the second threshold value Lth2 in S43, an end code, that is, an edge detection success, and the present pixel (i.e., the designated coordinates) are stored as an edge in S44, and the series of processes ends.

In contrast, if the addition result is judged to be smaller than the second threshold value Lth2 in S43, the designated coordinates are incremented by one in the process direction in S45, and whether the designated coordinates have reached a predetermined end point of the edge detection process is judged in S46.

If the designated coordinates are judged to have reached the end point of the edge detection process in the S46, an end code, that is, an edge detection failure, is written in S47, and the series of processes ends.

If the designated coordinates are judged to have not reached the end point of the edge detection process in S46, the process returns to S41.

The present embodiment makes it possible to detect the positions of four corners in the image data obtained from an image and to detect the image zone when an image, in which the gradation level has been changed by the method according to the first embodiment, is imported.

Figure 17:
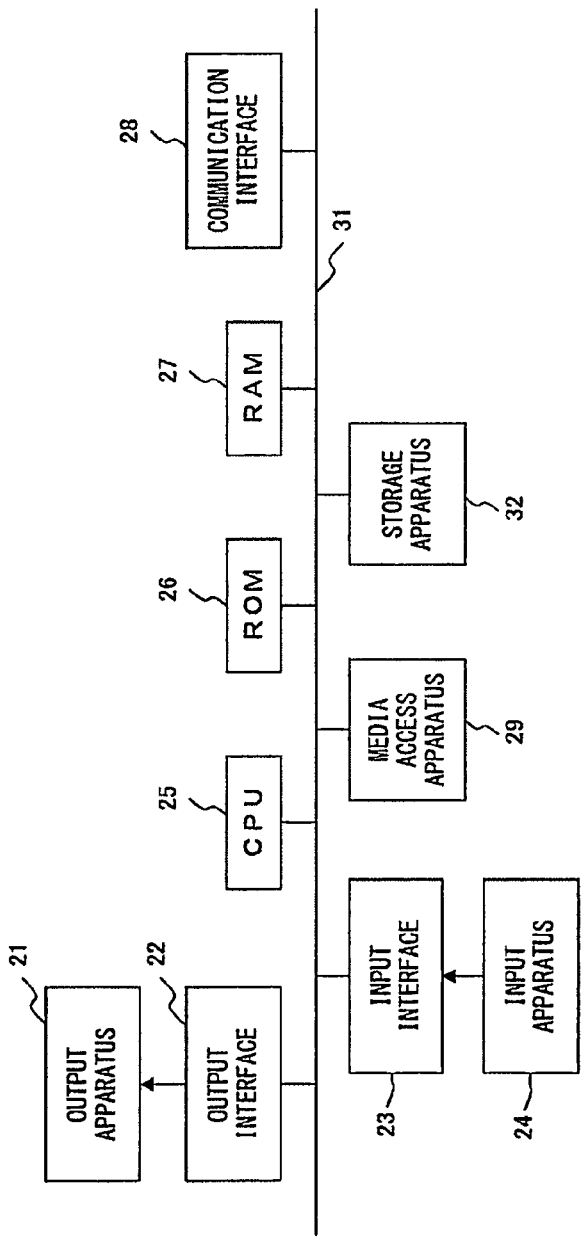
FIG. 17 is a diagram showing the hardware configuration of an apparatus for carrying out image processing (i.e., a gradation level change process) according to a first preferred embodiment.

FIG. 17 is a diagram showing the hardware configuration of an apparatus for carrying out image processing (i.e., a gradation level change process) according to the first embodiment.

The programs for carrying out the gradation level change process and the rectangular image data as a target of the gradation change process are loaded onto RAM (i.e., memory) 27 from a storage apparatus 32 such as ROM 26 and a magnetic disk apparatus, and are executed/referred to by a central processing unit (CPU) 25.

Alternatively, the program and/or data are loaded onto the RAM (i.e., memory) 27 from an external storage apparatus (not shown in a drawing herein) by way of a network and a communication interface 28, and are executed/referred to by the CPU 25.

Alternatively, the program and/or data are loaded onto the RAM (i.e., memory) 27 from a portable recording medium (not shown in a drawing herein) by way of a media access apparatus 29.

A user is enabled to instruct a program to initiate, a rectangular image to print before or after changing the gradation levels, and to give other instructions by way of an input apparatus 24 and an input interface 23.

Further, a rectangular image before or after changing the gradation levels is output to an output apparatus 21 by way of an output interface 22.

Figure 18:
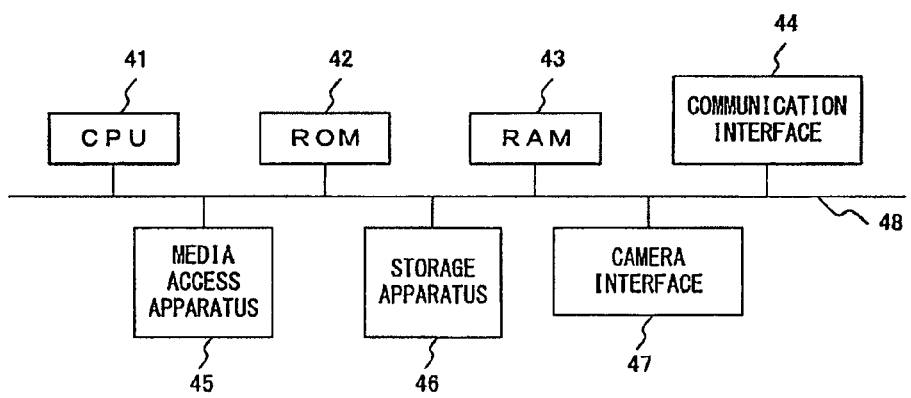
FIG. 18 is a diagram showing the hardware configuration of an apparatus for carrying out an image zone detection process according to a second preferred embodiment.

FIG. 18 is a diagram showing the hardware configuration of an apparatus for carrying out an image zone detection process according to the second embodiment.

The program for carrying out the image zone detection process can be loaded onto RAM (i.e., memory) 43 from a storage apparatus 46 such as ROM 42 and a magnetic disk apparatus and be executed by a CPU 41.

Alternatively, the program can be loaded onto RAM (i.e., memory) 43 from an external storage apparatus (not shown in a drawing herein) by way of a network and a communication interface 44 and be executed by the CPU 41.

Further alternatively, the program can be loaded onto the RAM (i.e., memory) 43 from a portable storage medium (not shown in a drawing herein) by way of a media access apparatus 45 and be executed by the CPU 41.

The user imports a rectangular image printed on a medium or electronically displayed in another medium by using an image pickup apparatus (not shown in a drawing herein). The imported rectangular image is loaded in the RAM (i.e., memory) 43 by way of a camera interface 47 so as to become a target of an image zone detection process.

Incidentally, the apparatus for carrying out an image zone detection process comprehends a camera phone, an information processing apparatus connected to an image scanner, and such.

Note that the gradation level change process according to the first embodiment is configured to obtain, and refer to, the minimum value of gradation levels in the surrounding area of a pixel that is a processing target (i.e., within a predefined section from the pixel) when determining the gradation level of the pixel that is the processing target in the above description. Further, the configuration is such that the difference between the gradation level of the pixel that is the processing target and that of the background area is maximized in the surrounding area of the pixel that is the processing target.

When reading, with a camera, an image in which the gradation levels have been changed and printed on a medium, there is the benefit of being able to detect four corners accurately.

In the flow chart according to the first embodiment shown in FIG. 7, however, it is possible to eliminate the processes of steps S15, S16 and S18. The L-shaped zone 506 shown in FIG. 6 is actually a result of such a process, leaving the form of the character "O" of "HELLO" intact, sparing it from being crushed. In this case, while there is a possibility that an edge will be erroneously detected if the difference between the black of the character "O" and the gray of the L-shaped zone 506 is larger than the difference between the aforementioned gray and the white of the background color, it is still possible to adopt this method, depending on the required accuracy in detecting four corners.

In the meantime, while the above description has assumed that the background color is white, the present embodiments may be configured to set the R and G components in the background color at discretionary values when expressing the color in the RGB format because only the gradation levels of B components are compared according to the present embodiments.

Further, while the above description has been provided by using a color expression in the RGB format, the present invention is applicable to cases of other color expressions (such as yellow, magenta, cyan and black (YMCK)).

What is claimed is:

1. An image processing method for changing the gradation levels of a pixel within a rectangular zone of a rectangular image in which a code is embedded, comprising the steps of:
    obtaining a gradation level of a color that is equivalent to the complementary color of yellow for a pixel in a background area;
    obtaining a gradation level of the color that is equivalent to the complementary color of yellow of a pixel that is a target of processing, within the zone located on a corner of the rectangular image;
    obtaining the minimum value of gradation levels of the color that is equivalent to the complementary color of yellow from among pixels included in a predefined section for the pixel that is the processing target;
    judging whether a first difference between the gradation level for the pixel in the background area and the gradation level of the pixel that is the processing target is equal or greater than a first threshold value; and
    if the first difference is smaller than the first threshold value, changing the value of the pixel that is the processing target to the smaller of two values,
        a second difference between the gradation level for the pixel in the background area and the first threshold value and
        the aforementioned minimum value
    wherein each of the steps is carried out for all pixels within the zone located on the corner.

2. An image processing method for changing the gradation levels of a pixel within a rectangular zone of a rectangular image in which a code is embedded, comprising the steps of:
    obtaining a gradation level of a color that is equivalent to the complementary color of yellow, of a pixel in a background area;
    obtaining a gradation level of the color that is equivalent to the complementary color of yellow of a pixel that is a target of processing, within the zone located on a corner of the rectangular image;
    judging whether a first difference between the gradation level for the pixel in the background area and the gradation level of the pixel that is the processing target is equal or larger than a first threshold value; and if the first difference is smaller than the first threshold value, changing the value of the pixel that is the processing target to a second difference between the gradation level for the pixel in the background area and the first threshold value wherein each of the steps is carried out for all pixels within the zone located on the corner.

3. A non-transitory computer readable recording medium storing an image processing program for making a computer execute the process for changing the gradation levels of a pixel within a rectangular zone for a rectangular image in which a code is embedded, wherein the method implemented by the image processing program comprises the steps of:

obtaining a gradation level of a color that is equivalent to the complementary color of yellow for a pixel in a background area;

obtaining a gradation level of the color that is equivalent to the complementary color of yellow of a pixel that is a target of processing, within the zone located on a corner of the rectangular image;

obtaining the minimum value of gradation levels of the color that is equivalent to the complementary color of yellow from among pixels included in a predefined section for the pixel that is the processing target;

judging whether a first difference between the gradation level for the pixel in the background area and the gradation level of the pixel that is the processing target is equal or larger than a first threshold value; and if the first difference is smaller than the first threshold value, changing the value of the pixel that is the processing target to the smaller of two values, a second difference between the gradation level for the pixel in the background area and the first threshold value and the aforementioned minimum value wherein each of the steps is carried out by the computer for all pixels within the zone located on the corner.

4. A non-transitory computer readable recording medium storing an image processing program for making a computer execute the process for changing the gradation levels of a pixel within a rectangular zone for a rectangular image in which a code is embedded, wherein the method implemented by the image processing program comprises the steps of:

obtaining a gradation level of a color that is equivalent to the complementary color of yellow, of a pixel in a background area;

obtaining a gradation level of the color that is equivalent to the complementary color of yellow of a pixel that is a target of processing, within the zone located on a corner of the rectangular image;

judging whether a first difference between the gradation level for the pixel in the background area and the gradation level of the pixel that is the processing target is equal or larger than a first threshold value; and if the first difference is smaller than the first threshold value, changing the value of the pixel that is the processing target to a second difference between the gradation level for the pixel in the background area and the first threshold value wherein each of the steps is carried out by the computer for all pixels within the zone located on the corner.

5. An image processing apparatus changing the gradation levels of a pixel a rectangular zone for a rectangular image in which a code is embedded, comprising:

a central processing unit configured to obtain a gradation level of a color that is equivalent to the complementary color of yellow for a pixel in a background area;

to obtain a gradation level of the color that is equivalent to the complementary color of yellow of a pixel that is a target of processing, within the zone located on a corner of the rectangular image;

to obtain the minimum value of gradation levels of the color that is equivalent to the complementary color of yellow among pixels included in a predefined section for the pixel that is the processing target;

to judge whether a first difference between the gradation level for the pixel in the background area and the gradation level of the pixel that is the processing target is equal or larger than a first threshold value;

if the first difference is smaller than the first threshold value, to change the value of the pixel that is the processing target to the smaller of two values, a second difference between the gradation level for the pixel in the background area and the first threshold value and the aforementioned minimum value and wherein each of the units operates on all pixels within the zone located on the corner of the rectangular image.

* * * * *